United States Patent [19]

Codina et al.

[11] Patent Number: 5,590,629
[45] Date of Patent: Jan. 7, 1997

[54] SPARK IGNITION SYSTEM OF AN INTERNAL COMBUSTION ENGINE

[75] Inventors: George Codina, North Hollywood, Calif.; Donald R. Krull, Galesburg; J. Thomas Vachon, Peoria, both of Ill.

[73] Assignee: Caterpillar Inc., Peoria, Ill.

[21] Appl. No.: 528,176

[22] Filed: Sep. 14, 1995

[51] Int. Cl.$^6$ .............................. F02P 15/02; F02P 15/04
[52] U.S. Cl. ........................................ 123/310; 123/162
[58] Field of Search .................................... 123/638, 310, 123/162

[56] References Cited

U.S. PATENT DOCUMENTS

| | | | |
|---|---|---|---|
| Re. 11,068 | 4/1890 | Regan | 123/162 |
| 553,488 | 1/1896 | Grant | 123/294 |
| 674,027 | 5/1901 | Snyder | 123/162 |
| 1,393,702 | 10/1921 | Sanchez | 123/162 |
| 1,785,411 | 12/1930 | Hamilton | 123/162 |
| 2,049,186 | 7/1936 | Zahodiakin | 123/79 C |
| 2,253,204 | 8/1941 | Lucci | 123/162 |
| 2,298,219 | 10/1942 | Major | 123/162 |
| 2,466,321 | 4/1949 | Mackenzie | 123/310 |
| 2,481,890 | 9/1949 | Toews | 123/310 |
| 3,349,760 | 10/1967 | Horan | 123/162 |
| 4,421,081 | 12/1983 | Nakamura et al. | 123/310 |
| 4,535,735 | 8/1985 | Yoshinaga et al. | 123/310 |
| 4,548,174 | 10/1985 | Anderson | 123/310 |
| 4,774,914 | 10/1988 | Ward | 123/162 |
| 4,848,287 | 7/1989 | Gillbrand et al. | 123/162 |
| 5,046,466 | 9/1991 | Lipski | 123/310 |
| 5,311,854 | 5/1994 | Cullum | 123/703 |

*Primary Examiner*—Willis R. Wolfe
*Attorney, Agent, or Firm*—Frank L. Hart; Calvin E. Glastetter

[57] ABSTRACT

A spark ignition system of an internal combustion engine has a plurality of electrodes operating at high voltages to produce a plurality of sparks across the combustion zone. The construction of the system permits the formation of long length sparks while substantially maintain the utilization of customary electrical wiring sizes.

11 Claims, 2 Drawing Sheets

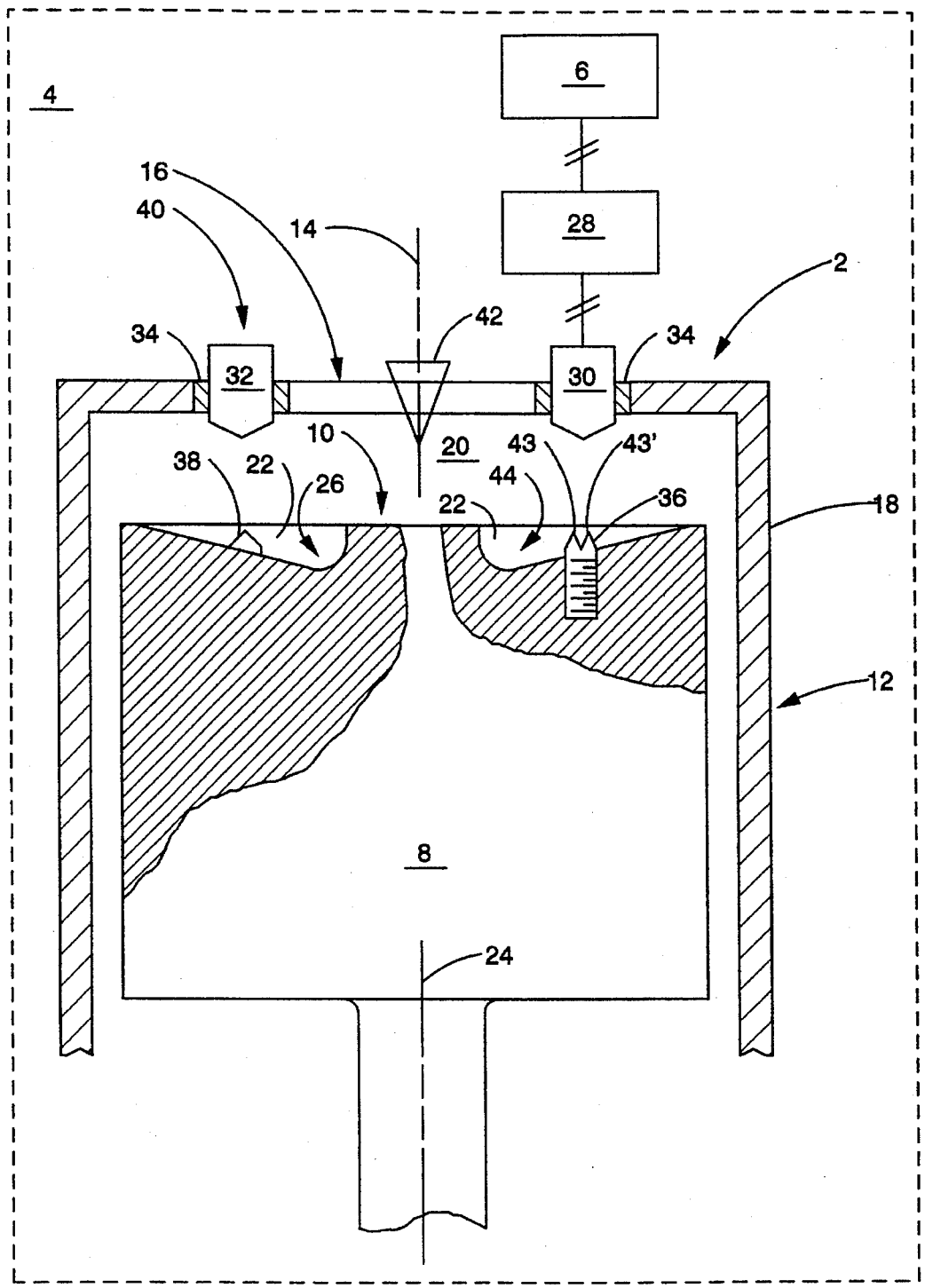
Fig_1_

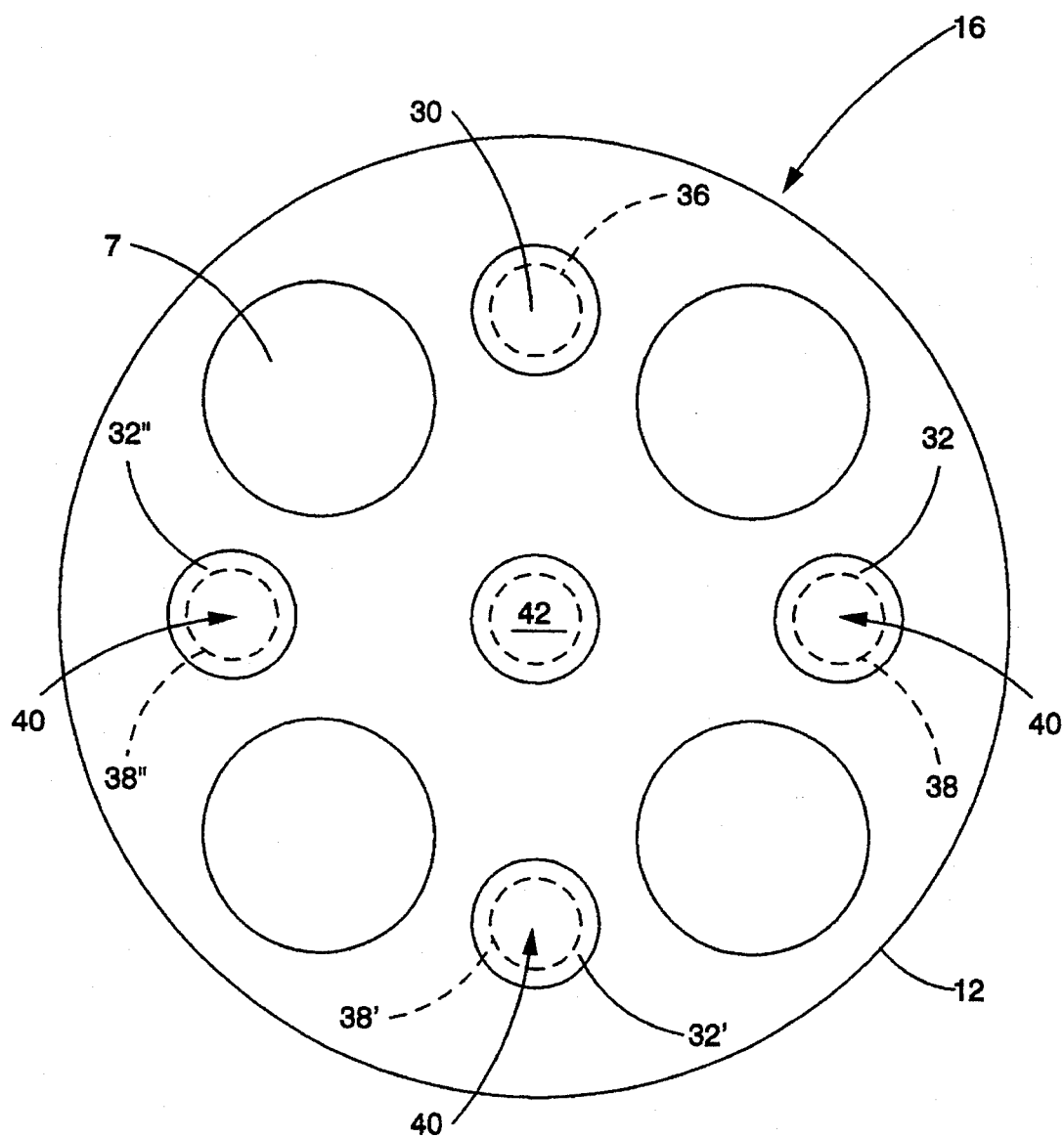
Fig_2_

SPARK IGNITION SYSTEM OF AN INTERNAL COMBUSTION ENGINE

TECHNICAL FIELD

The present invention relates to the spark ignition system of an internal combustion engine. More particularly, the invention is directed to the system for passing the spark through the combustion zone.

BACKGROUND ART

Since the advent of internal combustion engines, a great deal of research has been conducted to increase the efficiency of the engine. One primary area of investigation was directed to increasing the efficiency of combustion. A principle factor resided in generating an efficient spark directed in an efficient manner.

Problems that continue to hamper advancement are the limitations of gap length between electrodes without the waste of using high voltage wire, control of spark duration, and the longevity of the system.

The present invention is directed to overcome one or more of these problems.

DISCLOSURE OF THE INVENTION

In one aspect of the invention, a spark ignition system of an internal combustion has a controllable spark ignition system, a piston having a face and a cylinder having an axis, a top, and sidewalls. The piston is positioned within the cylinder with the piston face adjacent the cylinder top. The piston face, cylinder top and cylinder sidewalls define a primary combustion zone. The piston has a continuous depression formed on said face about the axis of the piston defining a secondary combustion zone.

A step-up pulse transformer is connectable to the controllable spark ignition system. First and second spaced apart electrodes extend through the cylinder top and into the primary combustion zone. The first electrode is connected to the step-up transformer and both electrodes are electrically isolated. A third electrode is connected to the piston at a location within the secondary combustion zone and adjacent the first electrode. A forth electrode is connected to the piston at a location within the secondary combustion zone and adjacent the second electrode.

BRIEF DESCRIPTION OF THE DRAWINGS

FIG. 1 is a diagrammatic side view in partial section showing the system of this invention; and FIG. 2 is a top view of the cylinder top of this invention.

BEST MODE FOR CARRYING OUT THE INVENTION

Referring to FIG. 1, a spark ignition system 2 of an internal combustion engine 4 has a controllable spark initiation system 6 which modernly is electronically controlled. The engine 4 has a piston 8 which has a piston face 10. The engine 4 also has a cylinder 12 which has an axis 14, a top 16 and sidewalls 18. The piston 8 is positioned within the cylinder 12 with the piston face 10 adjacent the cylinder top 16. The piston face 10, cylinder top 16 and cylinder sidewalls 18 define a primary combustion zone 20. Such apparatus is well known in the engine art.

In the embodiment of this invention, the piston 8 has a continuous depression 22 formed on said piston face 10. The depression 22 extends about the piston axis 24 and defines a secondary combustion zone 26.

The system 2 has a step-up pulse transformer 28, as is well known in the art, connectable to the controllable spark initiation system 6 of the engine 4. The transformer 28 boosts the voltage from about 24 volts to a voltage greater than about 60 KV. By so providing the transformer 28, the electric cables up to the transformer 28 utilizes conventional engine wiring which is of a size in the range of 40 to 50 KV. The spark initiation system 6 and the transformer 28 of this invention are constructed to deliver a controlled spark having an unconventional spark duration in the range from about 2 to about 100 micro seconds. As is well understood in the art, boosting of the voltage and extending the spark duration in the system of this invention does not require design work of such an extended period as to be classified as being of an inventive nature.

First and second electrodes 30,32 each extend through the cylinder top 16, are isolated therefrom by electrical insulation 34, and extend into the primary combustion zone 20. The first electrode 30 is electrically connected to the step up transformer 28 and the second electrode 32 is electrically isolated.

A third electrode 36 is connected to the piston 8 at a location within the secondary combustion zone 26 and adjacent the first electrode 30. A forth electrode 38 is connected to the piston 8 at a location within the secondary combustion zone 26 and adjacent the second electrode 32. These third and forth electrodes 36,38 extend outwardly from the lower most portion of the depression in a direction toward the respective associated electrode of the cylinder top 16. These electrodes 36,38 are preferably an integral portion of the piston 8, but can be separate and removably connected to the piston 8, as for example shown in FIG. 1 by the third electrode 36. The piston 8 and the electrodes 36,38 are formed of electrically conductive material and therefor spark initiation from the first electrode 30, passes through the primary combustion zone 20, into the secondary combustion zone 26, through the third electrode 36, into and through the body of the piston, through the forth electrode 38, back through the secondary combustion zone and the primary combustion zone 20 and into the forth electrode 38.

By boosting the pulsed voltage, the first and second electrodes and the second and forth electrodes are specifically position at a location greater than about 5 mm apart at initiation of the controlled spark. Spacing less than about 5 mm at initiation of the controlled spark is undesirable because spark power is less than preferred.

As is apparent during reading of the description, at less voltage of the spark, less separation of the electrodes at spark initiation, and higher energy requirements are factors contributing to electrode erosion and lower combustion efficiency.

Referring to FIGS. 1 and 2, the second electrode 32 and forth electrode 38 define a spark discharge system 40. Preferably there are a plurality of spark discharge systems associated with the primary combustion zone 20. The cylinder top 16 has a fuel injection nozzle positioned generally coaxial with the cylinder 12 and the combustion zones 20,26. The respective associated electrodes 30,36 and 32,38 are positioned transverse the cylinder axis 14 and each set of electrodes are preferably generally equally spaced one from the other, as can be best seen in FIG. 2. There can also be a plurality of discharge electrodes 32,38 and 32',38' and 32",38" which are also generally equally spaced from one another.

As can be seen for example in FIG. 1, the second electrode 32 can have a plurality of peaks 43, formed on the terminal end portion 44 of the electrode. The forth electrode 38 can also be formed with a plurality of peaks 43,43'. As one peak wears down, the associated peak of the terminal end portion 44 will receive the spark. This functions to extend the life of the receiving electrodes without significantly altering the efficiency during wear.

For purposes of brevity, the subject system has been described relative to a single combustion zone of the engine. It should be understood that the subject system can be utilized on all combustion zones of the engine and such multiple use is preferred.

Industrial Applicability

In the operation of the system of this invention, the voltage is increased adjacent the discharging electrode 30 which represents a saving of material and natural resources by utilizing conventional sized wiring up to the step up transformer 28. The larger voltage and greater gap between electrodes and the ability to generate multiple sparks across the primary combustion zone 20 function to efficiently ignite ultra lean mixtures of fuel for reduced emission and fuel consumption, reduce the requirement for providing ultra efficient turbulence-swirl within the combustion chamber, reduces ignition delay, reduces flame propagation time, eliminates the need for pre-combustion chambers, and provides multiple point ignition.

Other aspects, objects and advantages of this invention can be obtained from a study of the drawings, the disclosure and the appended claims.

We claim:

1. A spark ignition system of an internal combustion engine having a controllable spark initiation system, a piston having a face and a cylinder having an axis, a top and sidewalls, said piston being positioned within the cylinder with the piston face adjacent the cylinder top, said piston face, cylinder top and cylinder sidewalls defining a primary combustion zone, comprising:

said piston having a continuous depression formed on said face about the axis of the piston and defining a secondary combustion zone;

a step-up pulse transformer connectable to the controllable spark initiation system;

first and second spaced apart electrodes each extending through the cylinder top and into the primary combustion zone, said first electrode being connected to the step-up transformer and both electrodes being electrically isolated;

a third electrode connected to the piston at a location within the secondary combustion zone and adjacent the first electrode; and a forth electrode connected to the piston at a location within the secondary combustion zone and adjacent the second electrode.

2. A system, as set forth in claim 1, wherein the second electrode and the forth electrode define a spark discharge system and including a plurality of spark discharge systems associated with the primary combustion zone.

3. A system, as set forth in claim 2, wherein the cylinder top has a fuel injection nozzle positioned generally coaxial with the cylinder and the combustion zones and their respective associated electrodes are positioned transverse the cylinder axis and generally equally spaced one from the other.

4. A system, as set forth in claim 1, wherein the cylinder top has a fuel injection nozzle positioned generally coaxial with the cylinder and the secondary combustion zone and associated electrodes are positioned transverse the cylinder axis.

5. A system, as set forth in claim 1, wherein the step up transformer is adapted to deliver an electrical pulse having a duration in the range of about 2 to about 100 micro seconds.

6. A system, as set forth in claim 1, wherein each electrode connected to the piston is integral with said piston.

7. A system, as set forth in claim 1, wherein each electrode connected to the piston is removably connected to the piston.

8. A system, as set forth in claim 1, wherein the electrodes connected to the piston and associated with the piston depression extends outwardly from the lower most portion of the depression in a direction toward the respective associated electrode of the cylinder top.

9. A system, as set forth in claim 1, including electrical insulation positioned between the cylinder top and the electrodes passing through said cylinder top.

10. A system, as set forth in claim 1. wherein the second and forth electrodes have a terminal end portion and a plurality of peaks formed on said terminal end portion.

11. A system, as set forth in claim 1, wherein the first and third second and forth respective associated electrodes are positioned at a location greater than about 5 mm apart at controlled spark initiation.

\* \* \* \* \*